(12) United States Patent
Pilkington et al.

(10) Patent No.: US 11,132,356 B2
(45) Date of Patent: Sep. 28, 2021

(54) OPTIMIZING DATA ENTRIES IN A LOG

(71) Applicant: INTERNATIONAL BUSINESS MACHINES CORPORATION, Armonk, NY (US)

(72) Inventors: Adam J. Pilkington, Eastleigh (GB); Katherine E. Stanley, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/118,825

(22) Filed: Aug. 31, 2018

(65) Prior Publication Data
US 2020/0073981 A1 Mar. 5, 2020

(51) Int. Cl.
*G06F 16/00* (2019.01)
*G06F 11/00* (2006.01)
(Continued)

(52) U.S. Cl.
CPC ...... *G06F 16/2379* (2019.01); *G06F 11/0787* (2013.01); *G06F 11/2268* (2013.01);
(Continued)

(58) Field of Classification Search
CPC ............. G06F 16/2379; G06F 16/2272; G06F 16/2322; G06F 16/2329; G06F 16/683; G06F 16/3476; G06F 16/1865; G06F 2201/81; G06F 11/3476; G06F 11/1471; G06F 11/0787; G06F 11/0778; G06F 11/0751; G06F 11/0766; G06F 11/366; G06F 11/3664; G06F 11/2268; G06F 11/323; G06F 11/3072; G06F 11/3644; H04L 4/069; H04L 67/16
See application file for complete search history.

(56) References Cited

U.S. PATENT DOCUMENTS 6,728,879 B1 * 4/2004 Atkinson ............... G06Q 30/06
707/999.202
7,155,514 B1 * 12/2006 Milford ................. H04L 41/06
709/225
(Continued)

FOREIGN PATENT DOCUMENTS

EP  1 777 638 A1 * 4/2007
JP  2013025655 A   2/2013
WO  WO2014117298  *  8/2014

OTHER PUBLICATIONS

Marcello Cinque et al., "Event Logs for the Analysis of Software Failures A Rule-Based Approach", IEEE Transactions on Software Engineering, vol. 39, No. 6, Jun. 2013, pp. 806-821.*
(Continued)

*Primary Examiner* — Srirama Channavajjala
(74) *Attorney, Agent, or Firm* — L. Jeffrey Kelly

(57) ABSTRACT

Systems, methods and computer program products are provided. An indication that a log of data entries has reached a size limit for the log is received. The data entries are continually stored in the log over time, and each entry comprises an associated log level. A threshold log level for data entries in the log is determined. At least one new data entry for the log is received. An existing data entry having a log level less than or equal to the threshold log level is overwritten by the new data entry, so that the size limit is not exceeded.

15 Claims, 7 Drawing Sheets

(51) Int. Cl.
*G06F 16/23* (2019.01)
*G06F 16/22* (2019.01)
*G06F 11/07* (2006.01)
*G06F 16/28* (2019.01)
*H04L 29/08* (2006.01)
*G06F 11/22* (2006.01)
*G06F 11/36* (2006.01)

(52) U.S. Cl.
CPC ...... *G06F 11/3664* (2013.01); *G06F 16/2272* (2019.01); *G06F 16/285* (2019.01); *H04L 67/16* (2013.01)

(56) References Cited

U.S. PATENT DOCUMENTS

| | | | | |
|---|---|---|---|---|
| 7,203,930 | B1* | 4/2007 | Kirkpatrick | G06F 11/3664 714/57 |
| 7,676,760 | B1* | 3/2010 | Rosenquist | G06F 11/328 715/745 |
| 7,778,979 | B2 | 8/2010 | Hatonen et al. | |
| 8,032,489 | B2* | 10/2011 | Villella | G06F 11/3476 707/622 |
| 8,949,799 | B2 | 2/2015 | Che et al. | |
| 9,430,316 | B2* | 8/2016 | Narayanan | G06F 11/0706 |
| 9,448,886 | B2* | 9/2016 | Shuster | G06F 11/1076 |
| 9,983,974 | B2* | 5/2018 | Abdul | G06F 11/3466 |
| 10,007,685 | B2* | 6/2018 | Achar | G06F 16/278 |
| 2002/0143575 | A1* | 10/2002 | Hansen | G16H 30/20 705/2 |
| 2004/0030537 | A1* | 2/2004 | Barnard | H04L 43/16 702/194 |
| 2004/0250182 | A1* | 12/2004 | Lyle | G06F 11/0787 714/723 |
| 2006/0085689 | A1* | 4/2006 | Bjorsne | G06F 11/079 714/39 |
| 2006/0294214 | A1* | 12/2006 | Chou | H04L 41/0681 709/223 |
| 2008/0066083 | A1* | 3/2008 | Ladd | H04L 67/16 719/318 |
| 2008/0126828 | A1* | 5/2008 | Girouard | G06F 11/3644 714/2 |
| 2008/0126972 | A1* | 5/2008 | Ballard | G11B 15/689 715/772 |
| 2009/0076640 | A1* | 3/2009 | Nakamura | G06F 11/1461 700/110 |
| 2009/0125547 | A1* | 5/2009 | Kawakami | G06F 21/50 |
| 2009/0327196 | A1* | 12/2009 | Studer | G06F 21/552 706/47 |
| 2010/0023545 | A1* | 1/2010 | Gladkov | G06F 11/323 707/E17.005 |
| 2010/0100775 | A1* | 4/2010 | Slutsman | G06F 11/079 714/47.2 |
| 2010/0223491 | A1* | 9/2010 | Ladd | G06F 11/2268 714/2 |
| 2011/0145659 | A1* | 6/2011 | Ikeyama | G06F 11/0781 714/48 |
| 2011/0185234 | A1* | 7/2011 | Cohen | G06F 16/285 714/37 |
| 2012/0060173 | A1* | 3/2012 | Malnati | G06F 11/3072 719/318 |
| 2013/0073532 | A1* | 3/2013 | Bachar | G06F 16/10 707/704 |
| 2014/0053025 | A1* | 2/2014 | Marvasti | G06F 11/079 714/37 |
| 2014/0237297 | A1* | 8/2014 | Nagura | G06F 11/079 714/39 |
| 2016/0110121 | A1* | 4/2016 | Singh | G06F 3/064 711/156 |
| 2016/0306713 | A1* | 10/2016 | Diaconu | G06F 11/1474 |
| 2017/0063762 | A1* | 3/2017 | Machol | H04L 51/36 |
| 2017/0315898 | A1* | 11/2017 | Abdul | G06F 11/366 |
| 2018/0101607 | A1* | 4/2018 | Yoon | G06F 11/323 |
| 2018/0307551 | A1* | 10/2018 | Bacha | G06N 3/084 |

OTHER PUBLICATIONS

Marcello Cinque et al., "Event Logs for the Analysis of Software Failures: A Rule-Based Approach", IEEE Transactions on Software Engineering (vol. 39, Issue: 6, Jun. 2013), pp. 806-821.*

Christensen et al., "Adaptive Log Compression for Massive Log Data", SIGMOD'13, Jun. 22-27, 2013, New York, New York, USA, p. 1283.

IBM, "Managing the size of the log file", https://jazz.net/help-dev/clm/index.jsp?topic=%2Fcom.ibm.jazz.repository.web.admin.doc%2Ftopics%2Ft_customizing_log_file.html, accessed on Jul. 10, 2018, 1 page.

Mell, et al., "The NIST Definition of Cloud Computing," National Institute of Standards and Technology, U.S. Department of Commerce, Special Publication 800-145, Sep. 2011, pp. 1-7.

* cited by examiner

| SERVICE GENERATOR EVENT LOG ||||||
| --- | --- | --- | --- | --- |
| Correlation ID | Date and Time | Severity Level | Device/Service Name | Event data |
| 1234 | 2017-09-10 14:18:00.602 | INFO | generator-service-enablement: service A | Adding Readme |
| 1234 | 2017-09-10 14:18:00.610 | INFO | generator-service-enablement: service A | Adding Instrumentation |
| 1234 | 2017-09-10 14:18:00.618 | INFO | generator-service-enablement: service A | Adding Deployment service env info for service A |
| 1234 | 2017-09-10 14:18:00.619 | WARNING | generator-service-enablement: service B | Nothing to process for node |
| 1234 | 2017-09-10 14:18:00.619 | ERROR | generator-service-enablement: service B | Expected something to process |

*Figure 2*

OPTIMIZING DATA ENTRIES IN A LOG

BACKGROUND

The present invention relates to techniques for storing data entries in a log such as a log file, and, more specifically, to storing and managing data entries in a size-limited log and to optimize the data stored in the log.

SUMMARY

According to an embodiment, a method, computer system, and computer program product is provided. The present invention may include receiving an indication that a log of data entries has reached a size limit for the log. Data entries are continually stored in the log over time. Each data entry comprises an associated log level. The method determines a threshold log level for data entries in the log. The method receives at least one new data entry for the log. The method overwrites, with the new data entry, an existing data entry having a log level less than or equal to the threshold log level, so that the size limit is not exceeded.

According to another embodiment, a system is provided. The system includes a processor for processing data entries in a log. The system further includes data storage for storing the data entries in the log. Data entries are continually stored in the log over time. Each data entry includes an associated log level. The processor is configured to receive an indication that the log of data entries has reached a size limit for the log. The processor is further configured to determine a threshold log level for data entries in the log. The processor is configured to receive at least one new data entry for the log. The processor is configured to overwrite, with the new data entry, an existing data entry having a log level less than or equal to the threshold log level so that the size limit is not exceeded.

According to yet another embodiment, a computer program product is provided. The computer program product includes a computer readable storage medium having program instructions for processing and storing data entries in a log embodied within. Data entries are continually stored in the log over time. Each data entry includes an associated log level. The program instructions are executable by a processor to cause the processor to: receive an indication that the log of data entries has reached a size limit for the log; determine a threshold log level for data entries in the log; receive at least one new data entry for the log, and overwrite, with the new data entry, an existing data entry having a log level less than or equal to the threshold log level so that the size limit is not exceeded.

According to a further embodiment, a computer implemented method is provided. In response to determining that the size of an existing log of data entries is to be reduced to within a predefined size limit for the log, the method includes determining a threshold log level for data entries in the log, removing, from the log, one or more existing data entries having a log level less than or equal to the threshold log level, and determining whether the log has reached a size within the predetermined size limit. If it is determined that the log has not reached a size within the predefined size limit, the method further comprises: repeating the steps above recursively, until it is determined that the log has reached a size within the predefined size limit.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 depicts an example log containing log entries having different log levels, according to an embodiment of the present invention;

DETAILED DESCRIPTION

Figure 1:
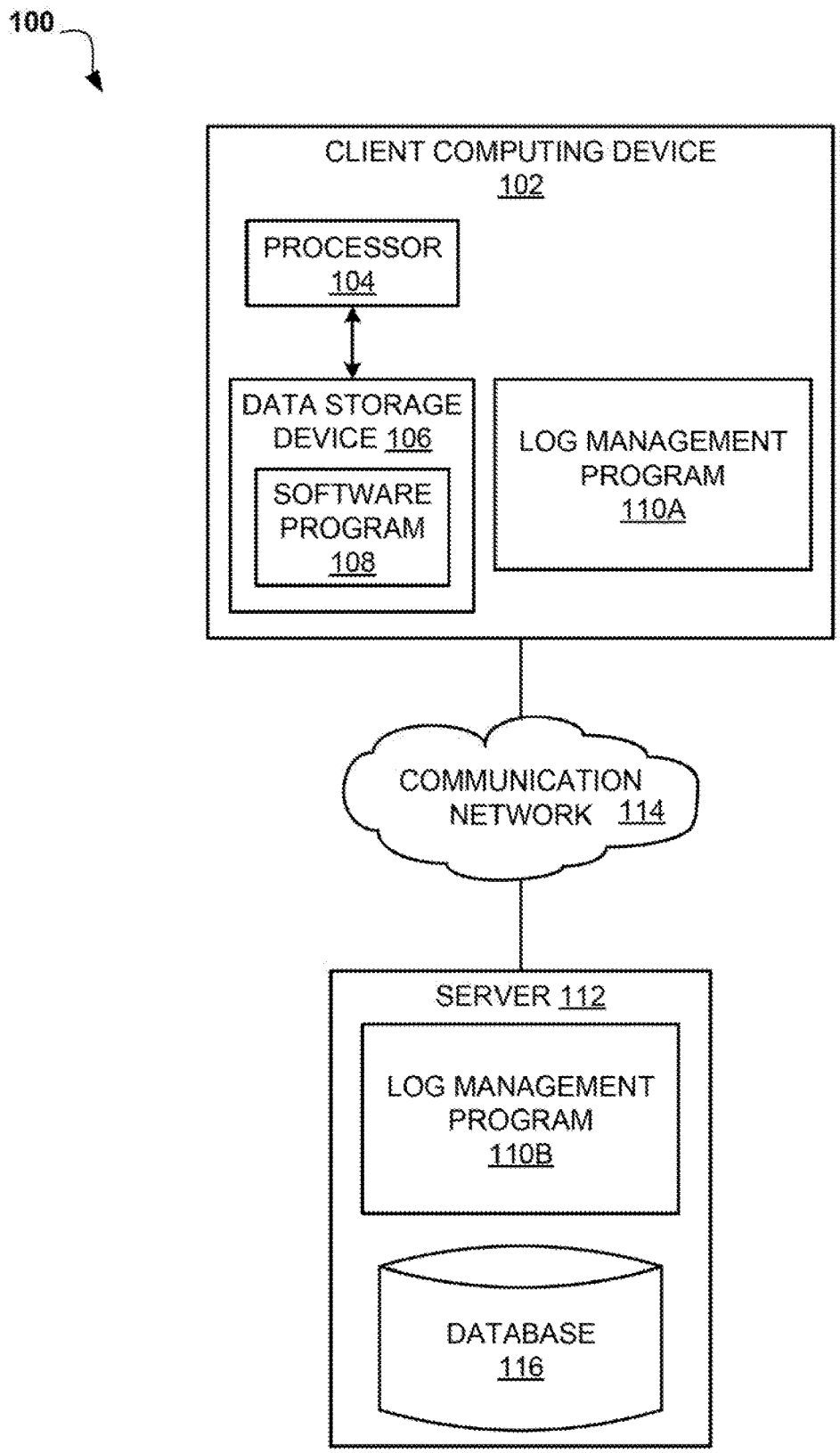
FIG. 1 depicts an exemplary networked computer environment according to an embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to techniques for storing data entries in a log such as a log file, and, more specifically, to storing and managing data entries in a size-limited log and to optimize the data stored in the log. Therefore, the present embodiment has the capacity to improve the technical field of data processing by managing data entries of a log.

Event generation and logging is commonly used in the field of computing to capture information about the operation of a computing system. For example, event logging techniques may be used to monitor the operation of a computing system, application, service or the like, and to generate events in response to detection of predefined actions or conditions. Generated events are typically stored or "logged" in a log in data storage, for use by a user to analyze the operation and identify and diagnose problems that may arise.

The size of a log is typically limited by the amount of data storage available for storage of the event data. In particular, a predefined amount of data storage may be allocated for the purpose of storing the log, for example as a size-limited "log file". However, a log file may continually receive event data over a prolonged time period. Furthermore, the entries to be logged may be generated by different events sources, and so data entries may not conform to the same size and form. Thus, a strategy is needed to manage a log file, so that the amount of event data stored does not exceed the memory size limit for the log file.

One conventional strategy for managing the size of a log file is known as "log rotation", which involves overwriting older entries in the log file with new entries. This leads to the overwriting of the oldest entries, irrespective of the information therein. In consequence, significant information contained in some of the older entries, which may assist the user in diagnosing problems, may be lost. Another strategy is to limit the types of events that are stored in the log file. For example, generated events may be filtered and stored based on a parameter of the event data, such as a severity level exceeding a threshold. This leads to the loss of event data, which may contain significant information, for example, indicating events leading up to a serious event, such as a failure. Thus, significant information, which may assist the user in diagnosing problems, may be lost. A further strategy is to increase the amount of data storage available for storing the log file. For instance, the log file may be stored in a distributed memory system (e.g., provided by a distributed logging service or a cloud based storage) instead of a more limited local memory (e.g., a dedicated local resource in an enterprise network). This prevents loss of event data but increases the consumption of data storage, processing, communication and other resources, and adds to the associated costs. Furthermore, the storage of log files in a distributed memory system may lead to difficulties in accessing the event data, due to call failures and/or delays. Finally, yet another strategy is compressing the log file. This requires increased processing resources (i.e., to compress/decompress data) and may not represent a complete solution, since data storage space for the compressed data may eventually run out.

The present disclosure provides methods, systems and computer program products for improved management of size-limited log files for storing data entries such as event data. In particular, example implementations of the present disclosure maintain the size of the log file within a defined size limit, whilst prioritizing the retention of more significant and/or useful entries. Thus, the data stored in the log file is optimized (e.g., by retaining significant event entries and associated event data). Whilst the following description relates to a log file of data entries comprising events and event data, it will be appreciated that the techniques of present disclosure are widely applicable to other types of log file, and associated types of data entries, in a variety of different contexts.

In the present disclosure, the term "log file" is used to refer to a record of data entries, such as events, also known as a "log". The term "log file" is not limited to any particular type of data structure or data storage, but is intended to encompass any suitable form of record or log containing data entries in any type of storage medium.

Referring to FIG. 1, an exemplary networked computer environment 100 is depicted, according to an embodiment. The networked computer environment 100 may include client computing computer 102 and a server 112 interconnected via a communication network 114. According to at an implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a log management program 110A and communicate with the server 112 via the communication network 114, in accordance with an embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components and external components, respectively.

The server 112 may be a laptop computer, netbook computer, personal computer (PC), a desktop computer, or any programmable electronic device or any network of programmable electronic devices capable of hosting and running a log management program 110B and a database 116 and communicating with the client computing device 102 via the communication network 114, in accordance with embodiments of the invention. As will be discussed with reference to FIG. 5, the server 112 may include internal components and external components, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the log management program 110A, 110B may be a program capable of maintaining a log file within a maximum data storage size while retaining priority log entries. The log management method is explained in further detail below with respect to FIGS. 3 and 4.

Referring now to FIG. 2, an extract of an example log file is shown, according to an embodiment. FIG. 2 shows an extract of an example log file storing data entries comprising events. In particular, the log file comprises events that are generated from monitoring a service for generating a project provided by a computing system (herein called "service generator"). In FIG. 2, each log entry (i.e., event) is represented by a row and comprises a plurality of data fields. The data fields include: a correlation ID field; a date and time field; a severity level field; a device/service name field, and an event data field. The correlation ID field comprises an identifier for the user request associated with the service generation that is monitored. Thus, all events arising during monitoring the generation of a particular project in response to a single user request contain the same correlation ID. The data and time field includes the date and time of the event. The severity level field indicates one of a plurality of possible severity levels (herein more generally called "log levels") associated with the event. The event data field comprises text and/or other information about the event.

The severity level field may also be referred to as a log level. The log level is a parameter that is typically part of each log entry. Log level values are ranking values, with the ranking corresponding to the level of severity of a problem associated with a computing event that lead to the creation of the log entry in the first place. Log level values may be numerical (0, 1, 2, 3) or described in words (for example: "normal operations," "possible problem," "small problem, and "big problem").

In the log file extract, five example event entries are shown. The event entries are associated with a single user request having correlation ID "1234". As a skilled person will appreciate, the full log file may contain large numbers of further event entries associated with more than one user requests, which may amount to many hundreds or thousands of entries, or more. The illustrated event entries have three severity levels (i.e., log levels), in particular a lowest log level called "INFO", a next log level called "WARNING" and a highest log level called "ERROR". The severity level of the event is typically determined based on the particular monitored or detected operation that is identified in the event. For example, some events may be generated at defined stages of normal operation (e.g., at key stages during the generation of a project by the service) and so assigned the lowest level "INFO". Other events may be generated when an abnormal condition is detected (e.g., an unexpected condition during generation of the project by the service) and so assigned one of the higher levels "WARNING" or "ERROR", depending upon the detected condition. The device/service name is shown as "generator-service-enablement: service A", and "generator-service-enablement: service B". The event data field contains text-based information associated with the particular event. As shown in FIG. 2, the event data in event entries with the log level "INFO" typically contain more generic information, denoting normal stages of operation such as "Adding Readme", "Adding Instrumentation", and "Adding Deployment service environment information for service A". Such generic text is typically replicated in the log entries for all user requests (assuming normal operation). In contrast, event entries with the log levels "WARNING" and "ERROR" contain more specific and targeted information about a detected, typically unexpected condition or the like, such as "Nothing to process for node" and "Expected something to process". As the skilled person will appreciate, in some instances a "WARNING" level event may precede an "ERROR" level event having the same cause. In the illustrated example, a common cause of two such events is the absence of expected data for processing by "service B". A first event is generated at the "WARNING" level (e.g., when the missing data does not arrive at the expected time) and a subsequent second event is generated at the "ERROR" level (e.g., when the data is still missing after a further time period indicating an error). Thus, enables unexpected conditions identified by events at the "WARNING" level to be resolved automatically, without generating an "ERROR" level event. Conversely, "ERROR" level events can typically be traced back to earlier "WARNING" level events, which may, in turn, contain significant information to help users to diagnose problems (e.g., to identify the root cause of the error condition causing the "ERROR" level event).

Figure 3:
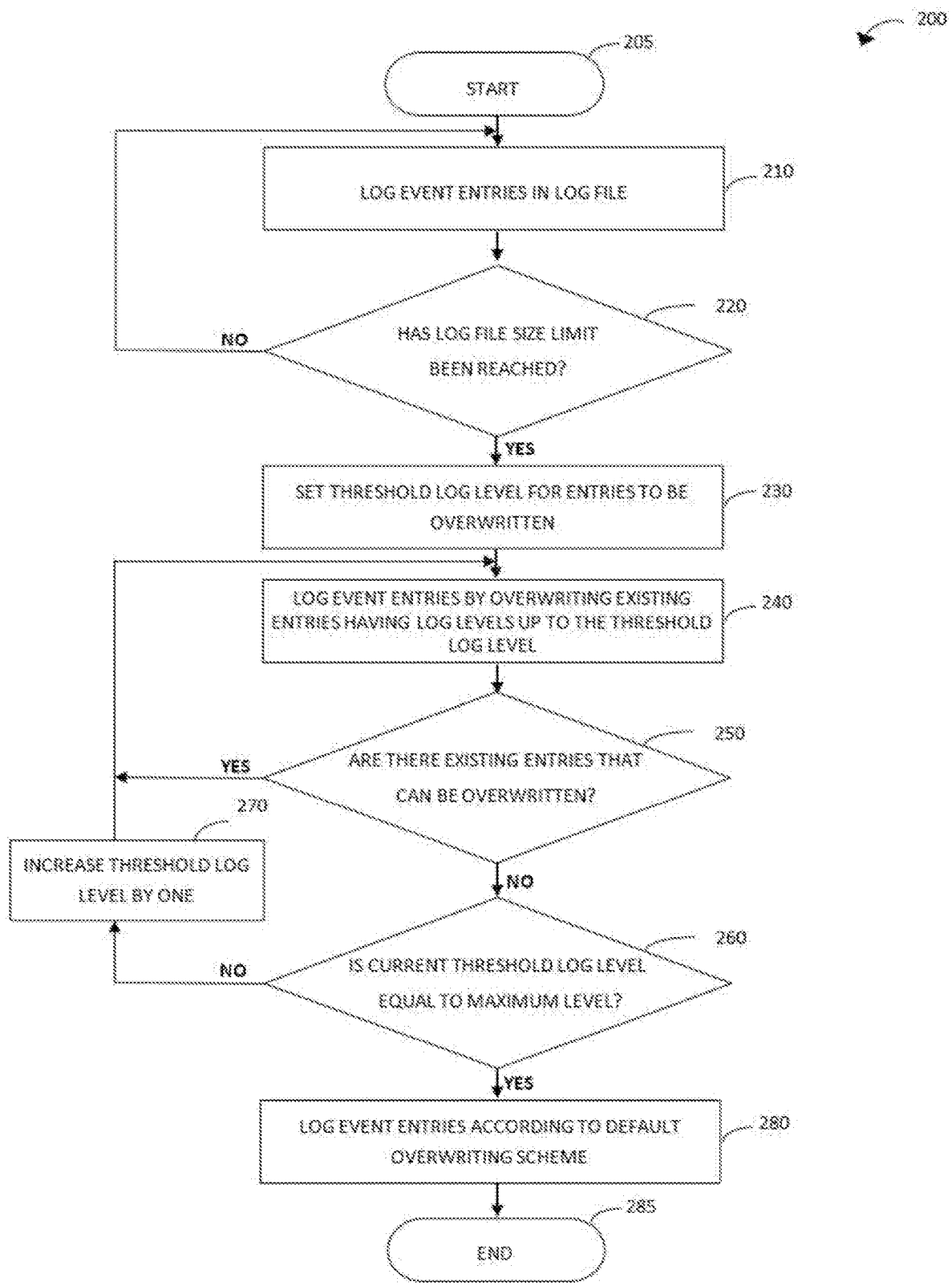
FIG. 3 is a flowchart of a method for optimizing the data stored in a log layers according to an embodiment of the present invention.

Referring now to FIG. 3, an operational flowchart of a method 200 for optimizing the data stored in a log layers in accordance with an example implementation of the present disclosure is shown. In particular, the method 200 manages a log file of event data entries, so that the event data stored in the log file does not exceed a predefined data storage size limit (i.e., amount of space for data available in data storage allocated for the log file). As the skilled person will appreciate, the data storage allocated for the log file may comprise any type of storage medium, including, but not limited to, cloud storage.

Method 200 starts at step 205. In particular, the method may start at step 205 when a log file is created, for example upon start-up of a system or launch of an application, service or the like with, which the log file is associated.

At step 210, the method 200 stores or "logs" event entries in the log file. For example, events may be received from an event source that monitors the system, application, service or the like, and generates events associated with detected operating conditions or the like, as described above and well known in the art. Thus, step 210 may store the data fields associated with each received event in log file. In some example implementations, events may be received from multiple event sources and/or generators for aggregation into a single log file.

At step 220, the method 200 determines whether the size limit for the log file has been reached. In particular, the log file may be allocated a predetermined amount of data storage space, which cannot be exceeded. Thus, in example implementations, step 220 may compare the data storage space utilized by the log file with the allocated data storage space. Step 220 may be performed periodically, for example at periodic time intervals or after a predetermined number of events have been stored. In example implementations, step 220 may be performed after a single event is stored in the log file. As the skilled person will appreciate, step 220 may determine that the size limit has been reached when there is insufficient data storage space available for the log file to store at least one data entry.

If step 220 determines that the log file size limit has not been reached, the method 200 returns to step 210 and continues to store entries in the log file. However, if step 220 determines that the log file size limit has been reached, then there is insufficient data storage space for storing new event entries, and the method 200 proceeds to step 230.

At step 230, the method 200 sets a threshold log level for event entries to be overwritten. In particular, the threshold log level defines upper limit for the log level (e.g., "severity level" of the event or equivalent) of existing entries in the log file that are permitted to be overwritten by new event entries. In an example implementation of the present disclosure, step 230 initially sets the threshold log level to a level below the highest log level. For example, if the event entries have ten different log levels from 1 (the lowest/least severe log level) to 10 (the highest/most severe log level), step 230 may set the initial threshold log level at 5 or 6, according to application requirements. In another example, if the event entries have three different log levels "INFO, "WARNING" and "ERROR" as described above with reference to FIG. 2, step 230 may set the initial threshold log level at "INFO" or "WARNING".

At step 240, the method 200 stores or "logs" new event entries in the log file by overwriting existing entries having log levels up to and including the threshold log level. In particular, step 240 may select existing event entries having log levels up to and including the threshold log level, for overwriting with new event entries. In accordance with example implementations of the present disclosure, step 240 may overwrite event entries in the log file using a defined scheme, which attempts to retain existing entries containing significant information. An example of a suitable scheme that may be used by step 240 is described below with reference to FIG. 4. Notably, since step 240 only overwrites existing entries having the lower log levels (i.e., up to and including the threshold log level), all existing entries having the higher log levels (i.e., above the threshold log level) are retained in the log file. Thus, significant information, which is typically contained in event entries having the higher log levels (i.e., log levels leading up to the highest log level), is retained in the log file.

At step 250, the method 200 determines whether there are existing entries in the log file that can be overwritten. Step 250 may be performed periodically, for example at periodic time intervals or after a predetermined number of events have been stored by overwriting selected existing events. In example implementations, step 250 may be performed after a single event is stored in the log file. As the skilled person will appreciate, step 250 may determine that there are no existing entries in the log file that can be overwritten when there are no more existing entries in the log file having log levels up to and including the threshold log level or when step 240 is unable to store new data entries by overwriting existing entries.

If step 250 determines that there are existing entries in the log file that can be overwritten, the method 200 returns to step 240 and continues to store event entries by overwriting existing entries having log levels up to and including the threshold log level in accordance with the defined scheme. However, if step 250 determines that there are no more existing event entries that can be overwritten, the method 200 proceeds to step 260.

At step 260, the method 200 determines whether the current threshold log level is at a defined highest possible threshold log level (herein "maximum threshold log level"). The maximum threshold log level may be defined below or at the highest log level for the event entries. Thus, in the above example of event entries have ten different log levels from 1 (the lowest/least severe log level) to 10 (the highest/most severe log level), the maximum threshold log level may be defined as 8, 9 or even the highest log level 10, according application requirements. In the example of event entries have three different log levels "INFO, "WARNING" and "ERROR" as described above with reference to FIG. 2, the maximum threshold log level may be defined as "WARNING" or "ERROR".

If step 260 determines that the current threshold log level is not equal to the maximum threshold log level, and thus is below the maximum threshold log level, the method proceeds to step 270 which increases the threshold log level. In an example implementation of the method 200 according to FIG. 3, step 270 increases the threshold log level by one. In another example implementation, step 270 may increase the threshold log level by another amount, according to application requirements. For example, if the events have ten possible log levels, step 270 may increase the threshold log level by two, or if the events have fifty possible log levels, step 270 may increase the threshold log level by five. The method 200 then returns to step 240, which continues to store new event entries in the log file based on the increased threshold log level. The method 200 then continues in a loop through steps 240 to 270, until step 260 determines that the current threshold log level is equal to the maximum threshold log level and the method 200 proceeds to step 280.

At step 280, the method 200 stores or "logs" event entries according to a default overwriting scheme. For example, the method 200 may overwrite existing event entries with new entries based on a predetermined parameter thereof, such as age, in accordance with a conventional "log rotation" scheme. The method may end at step 285.

Figure 4:
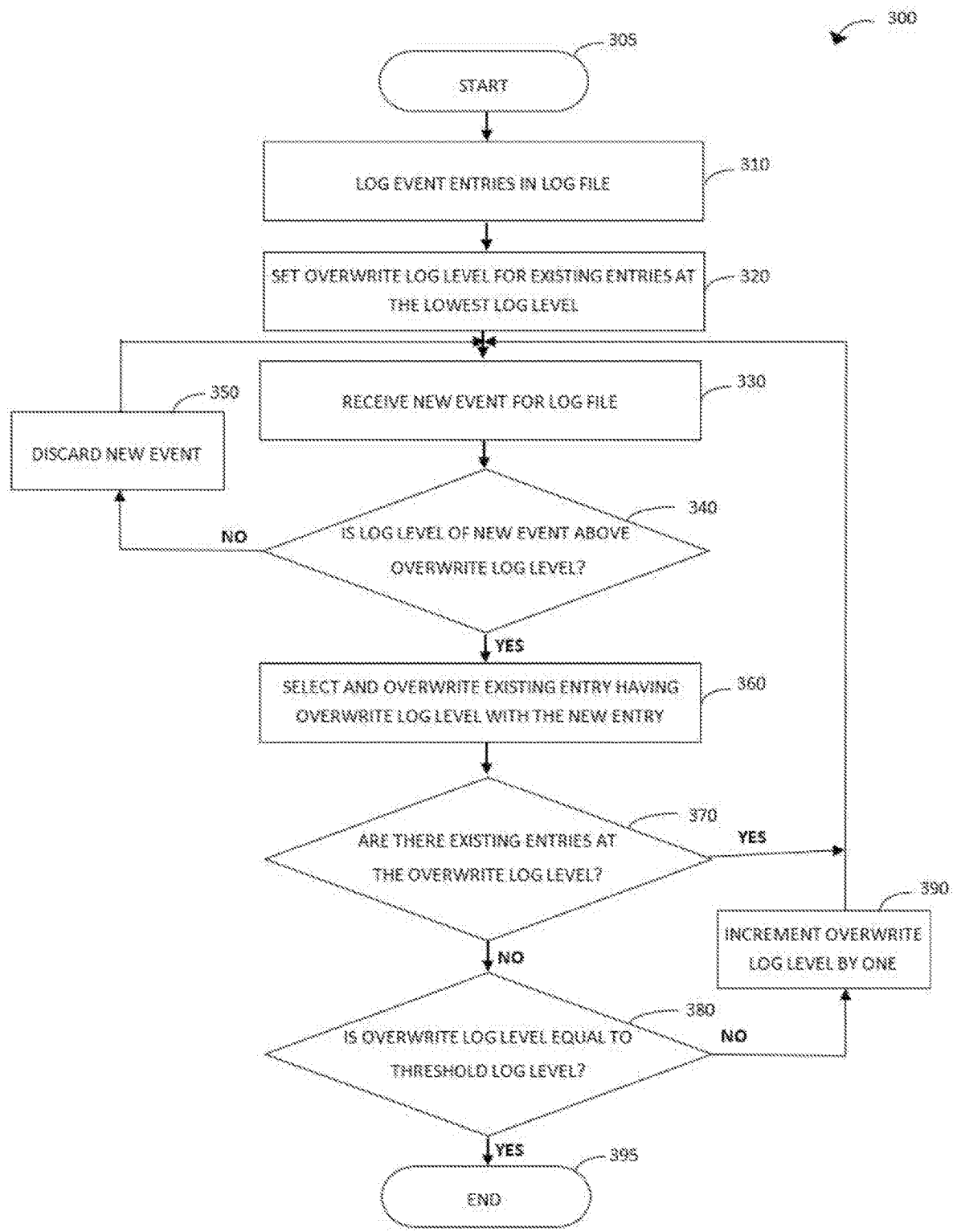
FIG. 4 is a flowchart of a method for logging entries, suitable for use in the method of FIG. 2, according to an embodiment of the present invention.

Referring now to FIG. 4, an operational flowchart of a method 300 for storing entries in a log file when a size limit for the log file has been reached is shown, in accordance with an example implementation of the present disclosure. For example, the method 300 may be performed during steps 240 and 250 of the method 200 of FIG. 2. The method 300 illustrates a scheme for optimizing the data in the log file, by retaining existing data entries that may have significant information, as described above. Other schemes are possible and contemplated by the present disclosure.

The method 300 starts at step 305. For example, the method may start in response to setting a threshold log level for event entries to be overwritten, in accordance with step 230 or step 270 of the method 200 of FIG. 3.

At step 310, the method identifies existing event entries in the log file having log levels up to and including the threshold log level. For example, step 310 may determine the log level for the existing event entries and identify the existing entries having log levels up to and including the threshold level. In example implementations, step 310 may identify existing event entries having each log level, from the lowest log level up to and including the threshold log level. Optionally, step 310 may also determine the data size of the identified existing entries and other relevant parameters, according to application and/or scheme requirements.

At step 320, the method sets the "overwrite log level" at the lowest log level for event entries. Thus, in the above example of event entries have ten different log levels from 1 (the lowest/least severe log level) to 10 (the highest/most severe log level), the overwrite log level is set to 1. In the example of event entries have three different log levels "INFO, "WARNING" and "ERROR" as described above with reference to FIG. 2, the overwrite log level is set to "INFO".

At step 330, the method receives a new event for the log file, for example from one of a plurality of event sources, as described above. At optional step 340, the method determines whether the log level of the new event is above the current overwrite log level.

If step 340 determines that the new event has a log level equal to the current overwrite log level, the method proceeds to step 350 which discards the new event. In particular, in accordance with an overwriting scheme implementing optional step 340, event entries with log levels equal to the current overwrite log level are not retained, and so the new event is not stored in the log file. The method then returns to step 330. However, if step 340 determines that the new event has a log level above the current overwrite log level (or step 340 is omitted), the method proceeds to step 360.

At step 360, the method selects, and overwrites with the new event, an existing event entry in the log file having a log level equal to the overwrite log level. In example implementations, the existing entry may be selected based on other parameters (e.g., data fields or properties) thereof in addition to log level, such as data size, age and the like, according to application requirements. Notably, the data size of the selected existing entry to be overwritten should be greater than or equal to the data size of the new event entry to be stored in the log file. In some example implementations, multiple existing entries may be selected and overwritten in step 360, when necessary, for example, due to the size of the new data entry. Following selection and overwriting of the existing entry in step 360, or if step 360 is unable to select an existing entry for overwriting, the method proceeds to step 370.

At step 370, the method determines whether there are existing entries in the log file having the current overwrite log level, and thus existing entries that can be overwritten. If step 370 determines that there are existing entries having the current overwrite log level, the method returns to step 330. The method then continues in a loop through steps 330 to 370, until step 370 determines that there are no longer any existing entries having the current overwrite log level, and the method proceeds to step 380.

At step 380, the method determines whether the current overwrite log level is equal to the threshold log level. Recall that the overwrite log level is initially set to a lowest log level for event entries, whilst the threshold log level may be set at a higher log level. In particular, in the above example of event entries have ten different log levels from 1 (the lowest/least severe log level) to 10 (the highest/most severe log level), the threshold log level may be set to 5 or 6 and the initial overwrite log level is set to 1, which is lower than the threshold log level.

Accordingly, if step 380 determines that the current overwrite log level is not equal to the threshold log level, the method proceeds to step 390 which increments the overwrite log level. In example implementations according to the method 300 of FIG. 4, step 390 increments the overwrite log level by one. In other example implementations, step 390 may increment the overwrite log level by another amount, according to application requirements. For example, if the events have ten possible log levels, step 290 may increment the overwrite log level by two, or if the events have fifty possible log levels, step 270 may increment the overwrite log level by five. The method then proceeds in a loop through steps 330 to 390, in which step 360 overwrite existing entries having the new (i.e., higher) overwrite log level, until step 380 determines that the current overwrite log level is equal to the threshold log level.

If step 380 determines that the current overwrite log level is equal to the threshold log level, the method ends at step 395. In the case that the method 300 of FIG. 4 is performed at steps 240 and 250 of the method 200 of FIG. 3, when the method 300 ends at step 395, the method 200 returns to step 260, which may increase the threshold log level, as described above.

As the skilled person will appreciate, the method 300 described with reference to FIG. 4 is just one example of a scheme for overwriting existing entries in a log file having log levels up to a threshold log level, with the aim of preserving significant information in the log file, by retaining existing entries that may have such significant information in the log file. Various alternative approaches, and/or modifications to the described example scheme, are possible and contemplated by the present disclosure.

In example implementations of the present disclosure, steps 340 and 350 of the method 300 of FIG. 4 may be omitted. In this case, new events may be stored in the log file irrespective of log level. Thus, step 360 may store new entries having the current overwrite log level, which may become candidates for selection for overwriting by subsequent received entries.

The method 300 described with reference to FIG. 4 assumes that the log level is present as a data field in the new events to be stored in the log file. However, in some example implementations, events may not have a separate field indicating a log level (e.g. severity level). In this case, the method may infer a log level for an event, based on content in one or more fields of the event. For example, the method may infer a highest/most severe log level for an event, when its event data contains words such as "error", "failure" or "fault". Conversely, the method may infer a lowest/least severe log level for an event, when its event data contains words such as "info", "comment" or "remark". A log level between the highest and lowest log levels may be inferred for an event in a similar way, based on the presence of words or similar content features in the event data. The inferred log level for a new event may be stored within the data entry in the log file, for use in selecting existing entries to be overwritten as described above.

The described example implementations relate to the storage of new entries in a size-limited log file, by overwriting existing entries, when the size limit would otherwise be exceeded. Other applications of the present disclosure are possible and contemplated. For example, the present disclosure may be used when transferring the data entries in a log file to a smaller storage space. Thus, if the smaller storage space is insufficient to store all of the existing data entries, data entries may be selected in accordance with the described techniques, and deleted from the log file instead of being overwritten. Thus, the overall size of the log file is reduced so that it can be stored in the target, smaller storage space without loss of significant data.

Figure 5:
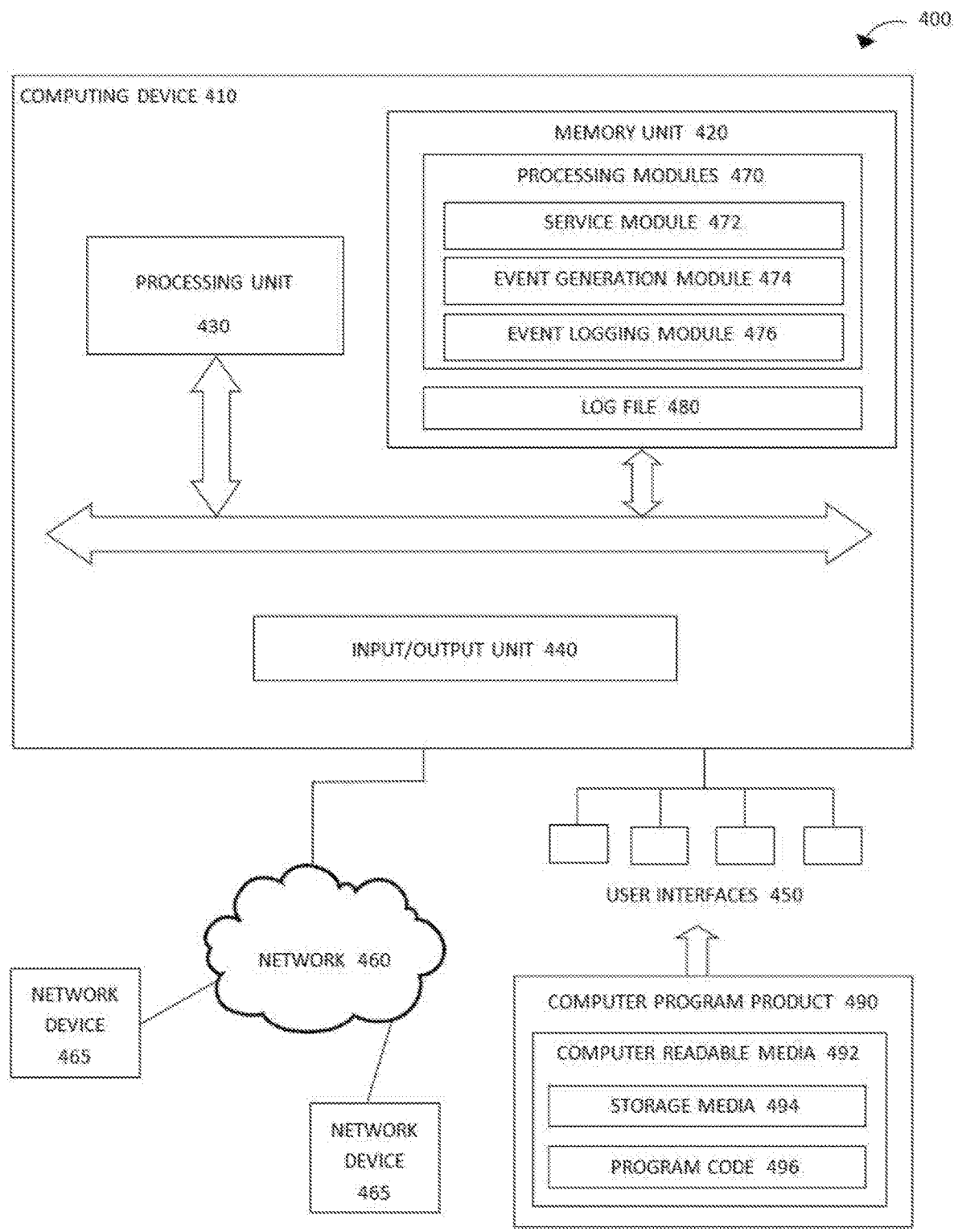
FIG. 5 is a block diagram of a computing system according to an embodiment of the present invention.

Referring now to FIG. 5, a block diagram of a computing system 400 is shown, in accordance with an example implementation of the present disclosure. In particular, the computing system 400 comprises a computing device 410, such as a server, the operations of which are monitored for event generation as described above. Computing device 410 comprises a memory unit 420, a processing unit 430 and an input/output (I/O) unit 440. Computing device 410 may include user interface devices 450 connected to I/O unit 440. User interface devices 450 may include one or more of a display (e.g., screen or touchscreen), a printer, a keyboard, a pointing device (e.g., mouse, joystick, touchpad), an audio device (e.g. microphone and/or speaker) and any other type of user interface device. I/O unit 440 may also be connected to a network 460 to send and receive data to other network devices 465 connected to the network 460. Network 460 may comprise any suitable wired or wireless data communications network, such as a local area network, wide area network or the Internet.

Memory unit 420 comprises one or more processing modules 470, for performing methods in accordance with the present disclosure, and a log file 480 having a limited size. Each processing module 470 may comprise instructions for execution by processing unit 430 for processing data and/or instructions received from I/O unit 440 and/or data and/or instructions stored in memory unit 420. In particular, processing modules 470 may include service module 472 for implementing a monitored service application or the like, and an event generating module 464 associated therewith. As the skilled person will appreciate, the present disclosure is not limited to any particular type of application program or software. Rather, the teachings of the present disclosure may be used in conjunction with any type of computing system, process or application, the operation of which is monitored, and for which events are generated for storage in a log file.

Event generating module 474 may monitor operations of the processing performed by the service module 472 and generate events for storing in log file 480. In accordance with example implementations of the present disclosure, processing modules 470 further include an event logging module 476 for receiving events from the event generating module 474 and storing the events in the size-limited log file 480 in accordance with the methods disclosed herein. In particular, event logging module 476 may be configured to log events for the application associated with service module 472 in the log file 480 in accordance with the method of FIG. 3, optionally in conjunction with the method of FIG. 4.

In the example implementation of FIG. 5, a single event generation module 474 is provided for monitoring the processing and operations of a single service module 472 of computing device 410, and for generating events associated therewith. As a skilled person will appreciate, in other example implementations, multiple event sources/generators may be employed, each associated with monitoring, and generation event, for a corresponding computing system, application, service or the like for a common purpose (e.g., delivery of a particular service). Such event sources/generators and associated systems may be configured in a distributed arrangement, for example connected to the network 460, and may send events for storage in the log file 480 in allocated data storage, such as in memory unit 420 of computing device 410. In other example implementations, the log file 480 itself may be located in a distributed storage arrangement (e.g., one or more network devices 465 connected to network 460). For example, log file 480 may be a size-limited allocation in cloud data storage provided by a cloud service provider.

With continuing reference to FIG. 5, a computer program product 490 may be provided. The computer program product 490 may include computer readable media 492 having storage media 494 and program instructions 496 (i.e., program code) embodied therewith. The program instructions 496 may be loaded onto memory unit 420 of computing device 410 via I/O unit 440, for example by one of user interface devices 450 or network devices 465 connected to network 460. The program instructions 496 may comprise event logging module 476 for storing events for the user application in the log file 480, in accordance with one or more of the methods discloses herein, as described above.

An application of the methods of the present disclosure is in relation to a code generation service of IBM® Corporation (IBM® is a registered trademarks of International Business Machines Corporation). Typically, a code generation service runs a number of code generators to produce a project, which is downloaded by service customers. Log events from the multiple code generators may be captured and aggregated into a single log file, which may be stored in a distributed data service. Such log events are composed of a lowest level called INFO to a highest level called ERROR and include event data, as described above with reference to FIG. 1. Typically, events with the lowest level INFO are somewhat generic, whilst events with the highest log level ERROR are more informative. Events are created by sub-generators that are written independently of the main code generation service functionality. This means is not possible to know, in advance, how many entries will be written by the sub-generators in practice, or the size or form (e.g., in terms of number and type of data fields) of those entries. Thus, it is difficult to ensure that the data storage space allocated to the log file enables all entries from the sub-generators to be stored. Accordingly, the described methods may be used to manage the events for a code generation service in the log file, in order to prevent "out of memory" conditions, whilst ensuring that as much as possible, entries with the most significant information are retained (i.e., not overwritten) for use for analysis and problem diagnosis.

An implementation of the methods of FIGS. 3 and 4 described above is applied to events for a code generation service of IBM® Corporation. Events are generated by sub-generators and provided to a logging function for storing in a log file. The events have three log levels, from lowest to highest: INFO, WARNING, ERROR. The method may proceed as follows:

Step 1. The code generation service receives a code generation request from a user.
Step 2. A new logging function is created with its log level set to INFO and associated with the UUID for the request.
Step 3. One or more sub-generators are invoked, which generate events associated with the code generation operation and provide the events to the logging function.
Step 4. All received events are logged until the size limit of the log file is reached.
Step 5. The logging function sets the threshold log level to WARNING.
Step 6. Subsequent events are handled as follows:
  Step 6.1. New events at the INFO level are discarded, and
  Step 6.2. For new events at the WARNING/ERROR level, existing entries at the INFO level in the log file are overwritten in reverse time order (i.e., oldest first).
Step 7. Events are logged until no more overwrite candidate entries at INFO remain, at which point the threshold log level is raised to ERROR.
Step 8. Subsequent events are handled as follows:
  Step 8.1 New entries at the INFO or WARNING level are discarded.
  Step 8.2 For new entries at the ERROR level, entries at the WARNING level (or lower) are overwritten in reverse time order.

It may be appreciated that FIGS. 1-5 provides only an illustration of an implementation and does not imply any limitations with regard to how different embodiments may be implemented. Many modifications to the depicted environments may be made based on design and implementation requirements.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
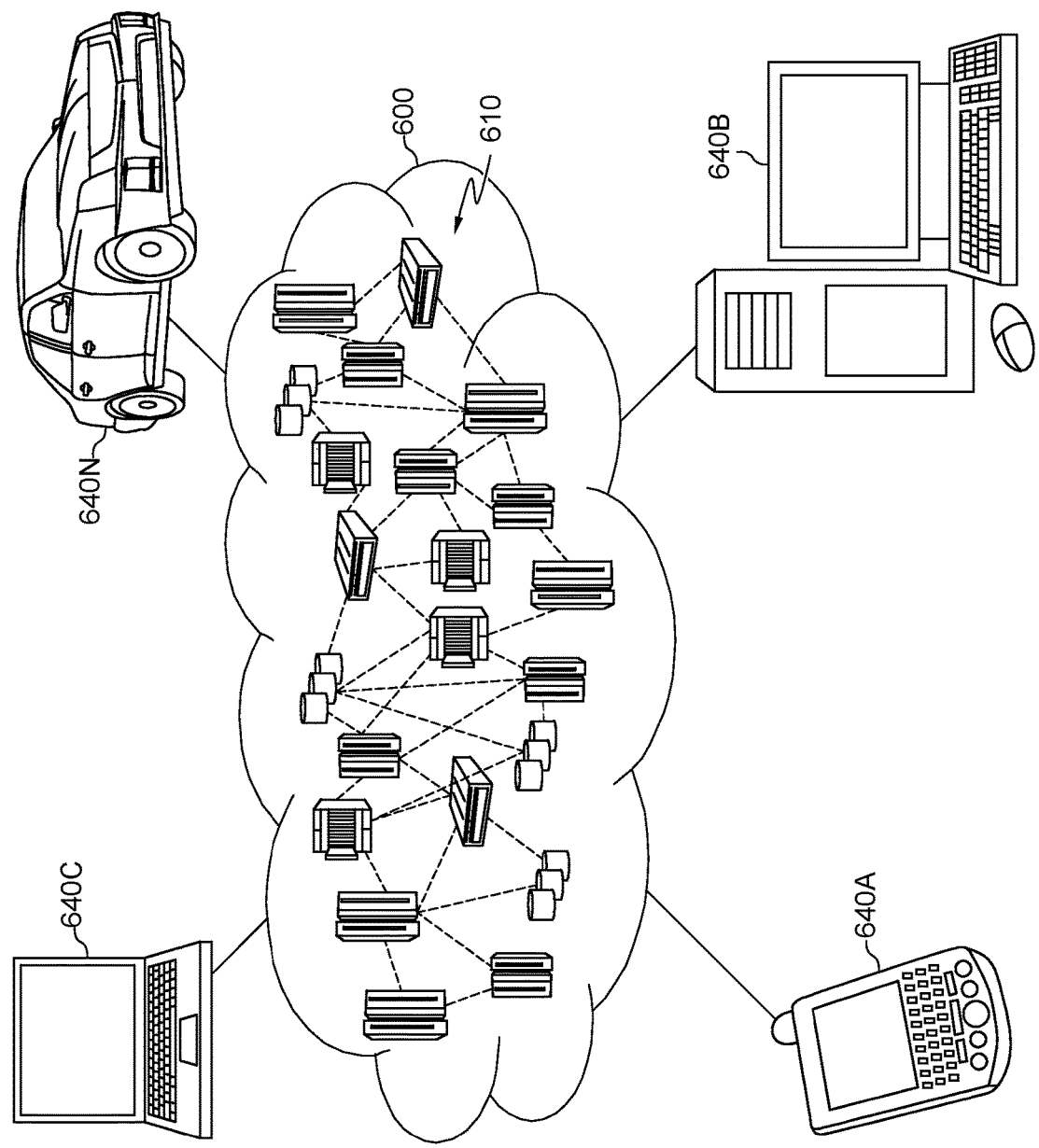
FIG. 6 depicts a cloud computing environment according to an embodiment of the present invention.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 640A, desktop computer 640B, laptop computer 640C, and/or automobile computer system 640N may communicate. Cloud computing nodes 610 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 640A-N shown in FIG. 6 are intended to be illustrative only and that cloud computing nodes 610 and cloud computing environment 600 can communicate with any type of computerized device over any type of network and/or network addressable connection (e.g., using a web browser).

Figure 7:
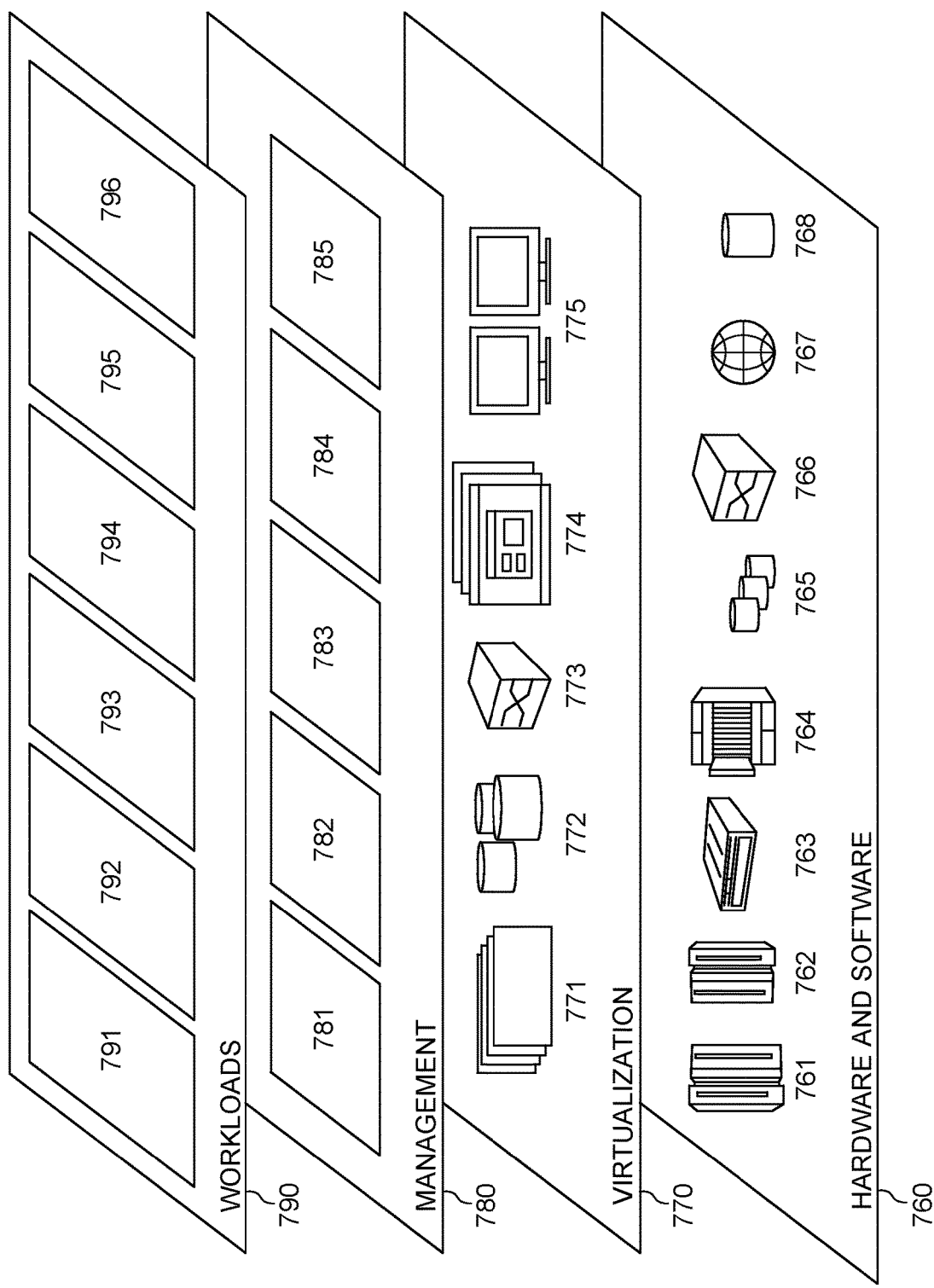
FIG. 7 depicts abstraction model layers according to an embodiment of the present invention.

Referring now to FIG. 7, a set of functional abstraction layers provided by cloud computing environment 600 (as shown in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772, for example the data storage device 106 as shown in FIG. 1; virtual networks 773, including virtual private networks; virtual applications and operating systems 774; and virtual clients 775.

In an example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and log file management program 796. The log file management program 796 may manage a log file such that the log file does not exceed a predefined data storage limit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A computer implemented method, comprising:
continually storing a group of data entries in an event log over time, wherein each data entry of the group of data entries is generated in response to detection of a predefined condition of a computer system by a monitoring service, a severity level is assigned to each data entry of the group of data entries based on a severity of the predefined condition associated with each data entry of the group of data entries, a severity level of INFO is assigned at a defined stage of normal operation, a severity level of WARNING is generated at an unexpected condition during generation of a project, a severity level of ERROR is assigned when data is missing after a set period of time;
detecting a first new instance of a predefined condition of the computer system by the monitoring service;
determining there is insufficient data storage space in the event log for a first new data entry documenting the first new instance of the predefined condition;
scanning the event log to identify a first set of data entries of the group of data entries comprising a severity level less than or equal to INFO;
in response to identifying the first set of data entries, overwriting one or more data entries of the first set of data entries with the first new data entry;
detecting a second new instance of a predefined condition of the computer system by the monitoring service;
determining there is insufficient data storage space in the event log for a second new data entry documenting the second new instance of the predefined condition;
re-scanning the event log to identify a second set of data entries stored in the event log comprising a severity level less than or equal to INFO; and
in response to identifying no data entries exist for the second set, re-scanning the event log to identify a third set of data entries stored in the event log comprising a severity level less than or equal to WARNING.

2. The method according to claim 1, further comprising:
in response to identifying the third set of data entries, overwriting one or more of the third set of data entries with the second new data entry.

3. The method according to claim 1, further comprising:
in response to identifying no data entries exist for the third set, storing the second new data entry in the event log according to a default overwriting scheme.

4. The method according to claim 1, further comprising:
selecting one or more data entries of the first set of data entries to overwrite with the first new data entry, based on size, age and content of each data entry of the first set of data entries.

5. The method according to claim 1, further comprising:
based on determining that a new data entry comprises a severity level less than the threshold severity level, discarding the new data entry without storing it in the event log.

6. A computer system comprising:
one or more processors, one or more computer-readable storage media, and program instructions stored on the one or more of the computer-readable storage media for execution by at least one of the one or more processors, wherein the computer system is capable of performing a method comprising:
continually store a group of data entries in an event log over time, wherein each data entry of the group of data entries is generated in response to detection of a predefined condition of a computer system by a monitoring service, a severity level is assigned to each data entry of the group of data entries based on a severity of the predefined condition associated with each data entry of the group of data entries, severity level of INFO is assigned at a defined stage of normal operation, a severity level of WARNING is generated at an unexpected condition during generation of a project, a severity level of ERROR is assigned when data is missing after a set period of time;
detecting a first new instance of a predefined condition of the computer system by the monitoring service;
determining there is insufficient data storage space in the event log for a first new data entry documenting the first new instance of the predefined condition;
scanning the event log to identify a first set of data entries of the group of data entries comprising a severity level less than or equal to INFO;
in response to identifying the first set of data entries, overwriting one or more data entries of the first set of data entries with the first new data entry;
detecting a second new instance of a predefined condition of the computer system by the monitoring service;
determining there is insufficient data storage space in the event log for a second new data entry documenting the second new instance of the predefined condition;

re-scanning the event log to identify a second set of data entries stored in the event log comprising a severity level less than or equal to the INFO; and in response to determining no data entries exist for the second set, re-scanning the event log to identify a third set of data entries stored in the event log comprising a severity level less than or equal to WARNING.

7. The computer system according to claim 6, further comprising:

in response to identifying the third set of data entries, overwriting one or more of the third set of data entries with the second new data entry.

8. The computer system according to claim 6, further comprising:

in response to identifying no data entries exist for the third set, storing the second new data entry in the event log according to a default overwriting scheme.

9. The computer system according to claim 6, further comprising:

selecting one or more data entries of the first set of data entries to overwrite with the first new data entry, based on size, age and content of each data entry of the first set of data entries.

10. The computer system according to claim 6, further comprising:

based on determining that a new data entry comprises a severity level less than the threshold severity level, discarding the new data entry without storing it in the event log.

11. A computer program product comprising:

one or more computer-readable tangible storage medium and program instructions stored on at least one of the one or more tangible storage medium, the program instructions executable by a processor, the program instructions comprising:

continually store a group of data entries in an event log over time, wherein each data entry of the group of data entries is generated in response to detection of a predefined condition of a computer system by a monitoring service, a severity level is assigned to each data entry of the group of data entries based on a severity of the predefined condition associated with each data entry of the group of data entries, severity level of INFO is assigned at a defined stage of normal operation, a severity level of WARNING is generated at an unexpected condition during generation of a project, a severity level of ERROR is assigned when data is missing after a set period of time;

detecting a first new instance of a predefined condition of the computer system by the monitoring service;

determining there is insufficient data storage space in the event log for a first new data entry documenting the first new instance of the predefined condition;

scanning the event log to identify a first set of data entries of the group of data entries comprising a severity level less than or equal to INFO;

in response to identifying the first set of data entries, overwriting one or more data entries of the first set of data entries with the first new data entry;

detecting a second new instance of a predefined condition of the computer system by the monitoring service;

determining there is insufficient data storage space in the event log for a second new data entry documenting the second new instance of the predefined condition;

re-scanning the event log to identify a second set of data entries stored in the event log comprising a severity level less than or equal to the INFO; and in response to determining no data entries exist for the second set, re-scanning the event log to identify a third set of data entries stored in the event log comprising a severity level less than or equal to WARNING.

12. The computer program product according to claim 11, further comprising:

in response to identifying the third set of data entries, overwriting one or more of the third set of data entries with the second new data entry.

13. The computer program product according to claim 11, further comprising:

in response to identifying no data entries exist for the third set, storing the second new data entry in the event log according to a default overwriting scheme.

14. The computer program product according to claim 11, further comprising:

selecting one or more data entries of the first set of data entries to overwrite with first new data entry, based on size, age and content of each data entry of the first set of data entries.

15. The computer program product according to claim 11, further comprising:

based on determining that a new data entry comprises a severity level less than the threshold severity level, discarding the new data entry without storing it in the event log.

* * * * *